United States Patent [19]
Arnett et al.

[11] 3,845,877
[45] Nov. 5, 1974

[54] INLET INSERT

[75] Inventors: Lawrence E. Arnett, Wayne; Earl M. Wiggins, Southfield, both of Mich.

[73] Assignee: Ford Motor Company, Dearborn, Mich.

[22] Filed: Apr. 6, 1972

[21] Appl. No.: 241,620

[52] U.S. Cl............................ 220/86 R, 251/149.2
[51] Int. Cl......................... B67c 3/00, F16l 33/00
[58] Field of Search......... 220/86 R, 86 AT, 86 NR, 220/85 F; 251/298, 299, 300, 301, 303, 149.2, 588; 141/325

[56] References Cited
UNITED STATES PATENTS

| | | | |
|---|---|---|---|
| 1,163,992 | 12/1915 | Ford................................. | 220/86 R |
| 2,302,972 | 11/1942 | Nuckols............................ | 222/557 |
| 2,347,737 | 5/1944 | Fuller................................ | 220/33 |
| 2,588,819 | 3/1952 | Garneau........................... | 222/557 |
| 2,855,620 | 10/1958 | Jones................................ | 222/557 |
| 3,225,398 | 12/1965 | Davey et al...................... | 222/557 |
| 3,272,471 | 7/1966 | McCullah......................... | 251/149.2 |
| 3,334,779 | 8/1967 | Smith................................ | 220/86 R |
| 3,580,414 | 5/1971 | Ginsburgh........................ | 251/149.2 |
| 3,730,216 | 5/1973 | Arnett et al...................... | 251/149.2 |

Primary Examiner—William T. Dixson, Jr.
Assistant Examiner—Allan N. Shoap
Attorney, Agent, or Firm—R. E. Erickson; K. L. Zerschling

[57] ABSTRACT

An insert to be positioned within the fuel tank filler or inlet pipe of an automotive vehicle to prevent filling the tank with improper fuels. The insert would permit entry of and delivery from a pump nozzle spout of a predetermined diameter or less, to be used with non-leaded fuels and would preclude entry of and delivery from a larger diameter pump nozzle spout, to be used with leaded fuels. The insert includes a pivotal member having an opening which must be aligned with a second, fixed opening to effect insertion of the nozzle.

5 Claims, 3 Drawing Figures

INLET INSERT

BACKGROUND AND SUMMARY OF THE INVENTION

When catalytic mufflers are used to treat the exhaust gases of internal combustion engines, means to prevent refueling with leaded fuels are desirable. Use of leaded fuel would permanently reduce or eliminate the effectiveness of the catalysts.

It has been proposed that service station pumps for non-leaded fuels have nozzle spouts of a predetermined diameter or less and that pumps for leaded fuels have larger diameter nozzle spouts. This invention provides an insert positionable within the inlet or filler pipe of the fuel tank of an automobile which accepts the smaller diameter nozzle spout which does not accept the larger diameter spout. This invention also provides an insert which cooperates with the automatic shut-off mechanism of a fuel pump nozzle to prevent entry of significant quantities of leaded fuel delivered through nozzle spouts of the large diameter. Further, this invention provides means to discourage and prevent intentional filling of a fuel tank with leaded fuel delivered through a larger diameter nozzle spout. The invention provides a construction which is economical to produce and install and which is reliable and effective in operation.

The invention also provides apparatus which is applicable for use in storage containers other than automobile fuel tanks where the filling of the container or the discharge into the inlet could cause undesirable or harmful results.

An inlet insert constructed in accordance with this invention includes a member positioned within the inlet of the container having an opening which will accept a nozzle spout of a dimension of a predetermined magnitude or less and which will not accept a nozzle spout of a dimension greater than the predetermined magnitude. A gate is positioned within the inlet upstream of and adjacent to the member and is movable relative to it. The gate is biased toward a normal position at least partially obstructing the opening in the first member. The gate includes an element cooperative and engageable with a nozzle spout having a dimension equal to or less than the predetermined magnitude to permit the displacement of the nozzle spout to displace the gate means and to remove the obstruction from the opening in the first member.

DETAILED DESCRIPTION OF A PREFERRED EMBODIMENT

Figure 1:
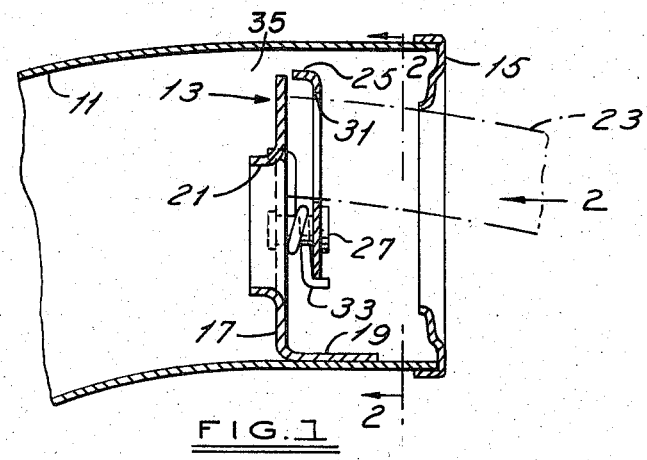
FIG. 1 is a cross-sectional view of an inlet or filler tube containing an insert constructed in accordance with this invention viewed in a direction perpendicular to the axis of the inlet tube.

An inlet pipe for an automobile fuel tank or other container is referred to in the drawings by numeral 11. An insert assembly 13 is secured to the walls of the inlet pipe adjacent its mouth 15. The insert assembly 13 includes a first member 17 including a pair of cylindrical portions 19 which are welded to the wall of the inlet tube. The first member includes a circular opening 21 of a diameter sufficiently large to accept a nozzle spout 23 of a predetermined diameter or less and to reject or refuse to accept a nozzle spout larger than the predetermined diameter.

A gate 25 is pivotally mounted to the first member 17 by means of a pin 27. The gate includes a portion 29 which is positionable over and upstream of the opening 21 to at least partially obstruct the opening. A second opening 31 is formed in the gate at a distance from the axis of pin 27 essentially identical to the distance of opening 21 from the axis so that the second opening 31 is alignable with the first opening 21 by movement of the gate relative to the first member about pin 27. The diameter of opening 21 is no less than and preferably equal to the diameter of opening 31 of the gaee 25. A spring is positioned about the pin 27 and biases the gate toward a normal position in which the openings are misaligned and the portion 29 obstructs the opening 21 a maximum amount.

Figure 2:
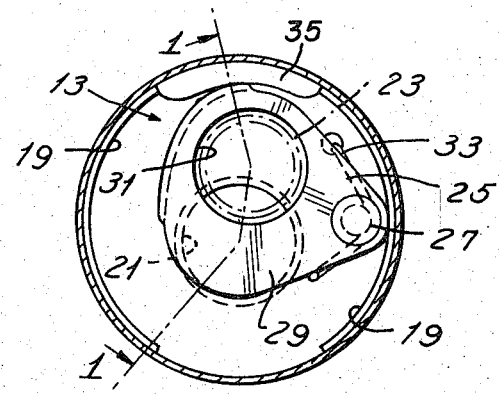
FIG. 2 is an elevational view taken along arrow 2 of FIG. 1 showing the gate means 25 in its normal position.
Figure 3:
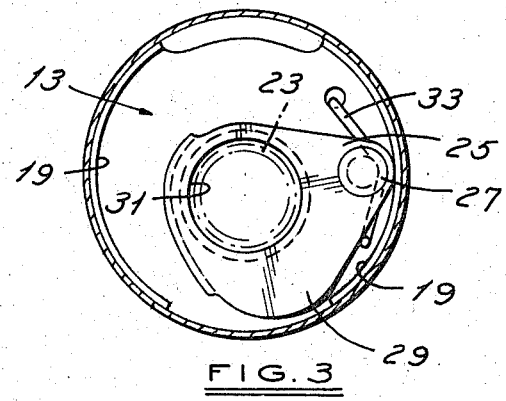
FIG. 3 is a front elevational view of the insert assembly showing the gate means 25 displaced to a position in which the gate opening 31 is aligned with the opening 21 of the backing member 17.

When liquid is to be delivered through a nozzle spout 23 of a diameter less than the diameter of the openings 21 and 31, the tip of the nozzle spout is placed within the opening 31 of the gate 25 as shown in FIGS. 1 and 2. By applying a lateral force to the nozzle spout the gate can be displaced about the axis of pin 27 until the holes 21 and 31 are aligned as shown in FIG. 3. The nozzle spout may then be fully introduced into opening 21 and unrestricted fuel delivery may be achieved.

A peripheral recess or vent 35 is provided in the first member 17 which enables air or vapor within the tank (not shown) to escape as the liquid is being introduced.

If a nozzle having a spout of a diameter greater than the diameter of opening 21 is used to attempt to introduce fuel into the inlet pipe 11, the tip of the nozzle will not be received within opening 21 and thus cannot be used to swing the gate 25 to a position in which openings 21 and 31 are aligned. The portion 29 of the gate will cause fuel to bubble back into the oversized diameter nozzle spout and the automatic shut-off device of the nozzle will terminate the delivery. It can be seen that accidental delivery of leaded fuel from a larger diameter or oversize nozzle spout is prevented and intentional delivery of fuel is made very difficult.

Modifications and alterations will occur to those skilled in the art which are included within the scope of the following claims.

1. A tank inlet pipe insert assembly to selectively accept and reject pump nozzle spouts on the basis of outer diameter magnitude, said insert assembly comprising:
   a first member secured to the inlet pipe and forming a partial closure thereof, said first member including a portion substantially perpendicular to the axis of said inlet pipe and having an opening formed therein
   a second member including a portion substantially parallel to said portion of said first member,
   means connecting said second member to said first member to pivot about an axis eccentric to the axis of said inlet pipe,
   a portion of said second member being positioned at least in part over said first opening, a second opening formed in said second member of a diameter of a magnitude to accept a nozzle spout of a first predetermined diameter and reject a nozzle spout of a second larger predetermined magnitude, spring means biasing said second member toward a normal position at least partially obstructing said first opening, said second member being displaceable from said normal position to a position in which said second opening is aligned with said first opening, said second member having dimensions less than the interior diameter of said inlet pipe to permit displacement of said second member relative to said inlet pipe.

2. A tank inlet insert assembly according to claim 1, vent means formed in said first member independent of said first opening to continuously vent the portion of the inlet pipe downstream of the insert assembly with the volume upstream of the insert assembly.

3. A tank inlet pipe insert assembly according to claim 1, pin means connecting said second member to said first member, the axis of said pin means being substantially parallel to and spaced from the axis of said inlet pipe adjacent said first member.

4. A tank inlet pipe insert assembly according to claim 1, said second member being pivotal relative to said first member about an axis substantially parallel to and spaced from the axis of said inlet pipe adjacent said first member.

5. A tank inlet pipe insert assembly according to claim 1, vent means formed in said first member independent of said first opening to continuously vent the portion of the inlet pipe downstream of the insert assembly with the volume upstream of the insert assembly and pin means connecting said second member to said first member, the axis of said pin means being substantially parallel to and spaced from the axis of said inlet pipe adjacent said first member.

* * * * *